United States Patent [19]

O'Hare et al.

[11] 4,089,812

[45] May 16, 1978

[54] MASSIVE CATALYST

[75] Inventors: Stephen A. O'Hare, Vienna, Va.; James E. Mauser, Albany; Clo Elton Armantrout, Corvallis, both of Oreg.

[73] Assignee: The United States of America as represented by the Secretary of the Interior, Washington, D.C.

[21] Appl. No.: 796,639

[22] Filed: May 13, 1977

Related U.S. Application Data

[63] Continuation-in-part of Ser. No. 709,999, Jul. 30, 1976, abandoned.

[51] Int. Cl.$^2$ .......................... B01J 21/04; B01J 23/74
[52] U.S. Cl. ............................ 252/466 J; 252/477 Q; 260/449.6 M
[58] Field of Search ............ 252/466 J, 477 Q, 477 R, 252/472; 260/449 M, 449.6 M

[56] References Cited

U.S. PATENT DOCUMENTS

| | | | |
|---|---|---|---|
| 2,583,619 | 1/1952 | White | 252/477 Q |
| 3,663,162 | 5/1972 | Randhava | 252/477 Q |
| 3,939,097 | 2/1976 | Takeoka et al. | 252/464 |
| 4,043,945 | 8/1977 | Fukui et al. | 252/466 J |

FOREIGN PATENT DOCUMENTS 658,863  10/1951  United Kingdom ............ 252/477 Q

*Primary Examiner*—W. J. Shine
*Attorney, Agent, or Firm*—William S. Brown; Donald A. Gardiner

[57] ABSTRACT

A massive shaped catalyst comprising a nickel-aluminum alloy having a surface layer of high surface area nickel.

15 Claims, 6 Drawing Figures

MASSIVE CATALYST

This application is a continuation-in-part of application Ser. No. 709,999, filed July 30, 1976, now abandoned.

BACKGROUND OF THE INVENTION

The reaction of $H_2$ with CO to produce methane, which is promoted by a Raney nickel catalyst, is conventionally carried out in a tube reactor which generally consists essentially of a stainless steel tube through which the gases are passed in contact with the catalyst. The reaction is highly exothermic, there being a 50° C temperature rise per 1% increase CO in the synthesis gas. Sintering or recrystallization of the catalyst can occur as a result of the high temperatures, leading to decreased activity. One of the problems encountered in developing a commercial process is how to increase the output of methane without overheating or poisoning the catalyst.

Usually, in the prior art methods, the catalyst is in the shape of pellets from which the heat has to be removed by gaseous conduction. Another method proposed is to coat the interior of 304 stainless steel reaction tubes with Raney nickel by flame spraying. A thin coat of Raney nickel, about 0.5 mm thick, is deposited by this method, and then activated by leaching with 2% NaOH solution. Excessive temperature buildup in the catalyst is prevented by removing the heat of reaction through the tubes to a heat exchange fluid. While successful, the method for preparing the tube in this manner has a number of drawbacks. The method of flame spraying is slow, about one foot of tube is coated per hour; the process is labor intensive and hence expensive; and causes dimentional distortions in the substrate tube. A relatively thin layer of Raney nickel is deposited so that the reactivation of the catalyst by abrading the depleted surface and regenerating is limited.

THE INVENTION

The present invention is concerned with a massive, shaped catalyst having generally longitudinal grooves or channels, adapted to fit as desired loosely, or snugly, within a reaction tube. The massiveness provides a heat sink and physical strength, the latter being especially important for brittle materials such as high area nickel. Within the tube, reaction gases flow along channels provided in the catalyst structure and the catalyzed conversion takes place. This system is especially useful in the intensely exothermic reaction of CO and $H_2$ to form methane conventionally employing a Raney nickel catalyst. If desired, the catalyst may be formed with a hollow core through which a cooling fluid may be conveyed.

The catalyst of the invention is prepared by initially forming a massive nickel aluminum alloy in substantially the size and shape desired for the final massive, shaped catalyst. The alloy is then treated with an alkali solution to dissolve the aluminum portion of the alloy from a surface layer of the massive alloy. This results in formation of a catalytically active layer of high surface area Raney-type nickel on the surface of the massive alloy.

The nickel-aluminum alloy has the composition of conventional Raney alloys. Typically, these consist of about 10 to 55 percent of nickel and 90 to 45 percent of aluminum, preferably about 42 to 50 percent nickel and 58 to 50 percent aluminum. These alloys are available commercially in powdered form, from which the massive, shaped alloy is prepared by conventional procedures such as sintering or casting the molten alloy. Such procedures are described, e.g., in U.S. Bureau of Mines Reports of Investigations 8182 and 8210. Preparation of the massive alloy may also utilize techniques such as welding, bolting or mechanically interlocking of various shapes to provide the desired massive alloy shape.

Alkali solutions employed in activation of the surface of the massive alloy are those conventionally employed in preparation of Raney nickel catalysts. Generally, sodium hydroxide is the preferred alkali, although potassium hydroxide may also be used. The alkali is generally employed in a concentration of about 2 to 25 percent, preferably about 10 percent.

Treatment with the alkali solution may be by any means suitable for dissolving the required amount of aluminum from the surface of massive alloy. Generally, simply immersing the alloy in the alkali solution, at suitable conditions of temperature and pressure, for a suitable period of time is an effective means of activating the surface of the alloy. Ambient conditions of temperature and pressure may be satisfactory; however, elevated temperature, e.g, about 95° C, usually gives a much more rapid reaction and is therefore generally preferred. Optimum time of contact between the alloy and the alkali solution will depend on the size, shape and composition of the alloy, the alkali solution employed and the utility of the finished catalyst, and is best determined empirically. Where, however, the catalyst is to be employed for methanation, a contact time sufficient to form the catalytically active layer of high surface area nickel having a thickness of about 0.25 to 1.25 mm is generally preferred. For a given massive alloy structure, the degree of activation may be conveniently determined by monitoring the volume of hydrogen evolved during the reaction since three moles of hydrogen are liberated for every two moles of aluminum consumed.

The massive catalysts of the present invention do not allow channeling of gases other than where desired and excessive pressure drops are avoided. Problems of adhesion of the catalyst to a substrate are eliminated since there is no substrate in the present invention. Heat is dissipated from the massive catalyst by conduction and convection. The methods employed in making the catalyst structures are not high labor cost items and the use of removeable and replaceable catalyst inserts, which permit rapid installation and removal, results in a further saving of labor costs.

In contrast to fine grids and wires of Raney nickel which have been employed, the massive construction of the present invention acts as a heat sink and prevents localized overheating of the catalyst. Also, because of their size, the massive structures are physically stronger than wires or grids. In further contrast to the prior art use of catalyst wires or particles or pellets, the present construction may provide interior cooling to prevent overheating, if desired. The channel structure in the catalyst inserts herein result in a smooth flow of reactive gas unlike fine or coarse powders in a reactor which may blow out or which retard gas flow. In addition, regeneration is readily accomplished herein by sand-blasting the old surface and reactivating by re-leaching with alkali solution.

FIG. 1 shows a cylindrical, centrifugal casting having a core 1 and exterior wall 2.

Figure 2:
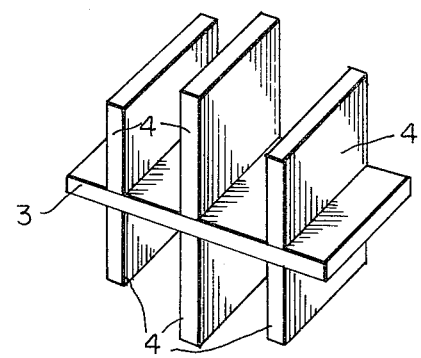

FIG. 2 shows a sand-cast parallel fin catalyst insert having a horizontal plate 3 and vertical plate 4. The ends of 3 and 4 are circumscribed within a circle and fit within a tube reactor.

Figure 3:
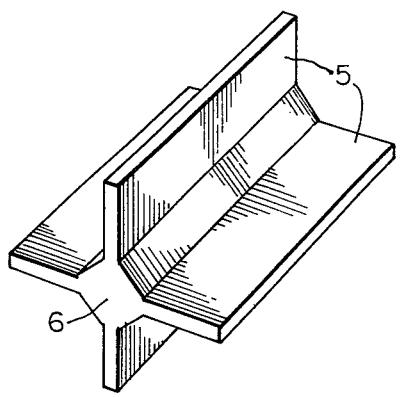

FIG. 3 depicts a star shaped insert made by sand casting and shows fins 5 on a central core 6.

Figure 4:
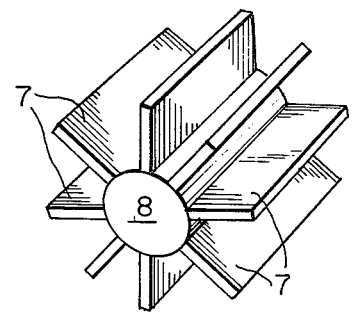

FIG. 4 illustrates a star shaped insert made by investment casting and shows fins 7 on a central core 8.

Figure 5:
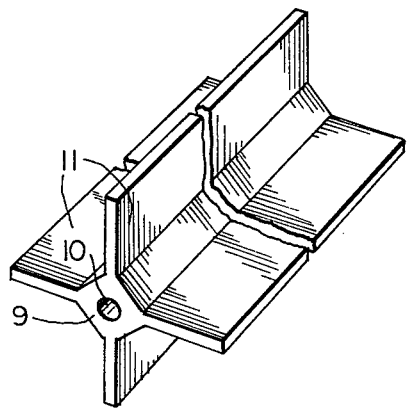

FIG. 5 shows a star shaped insert similar to FIG. 3 having a hollow core 9, a central bore 10 and fins 11.

Figure 6:
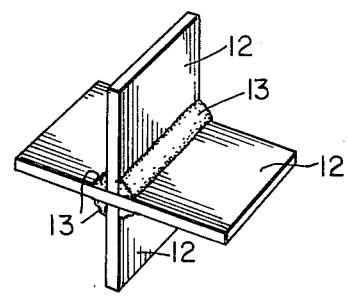

FIG. 6 shows an insert made by welding Raney alloy plates 12 to each other by weld beads 13.

The shapes may be dimensional to provide either a loose or a tight fit within a tube reactor, as desired. A loose fit permits easy installation and removal while a tight fit allows for greater heat conduction away from the catalyst through the tube walls. However, a tight fit may prevent ready removal of the inserts and could require sandblasting in place or other means to remove or renew the catalyst. Thus, a judgment must be made as to the relative importance of the various factors in determining the desired fit of the catalyst in the tube.

Figure 1:
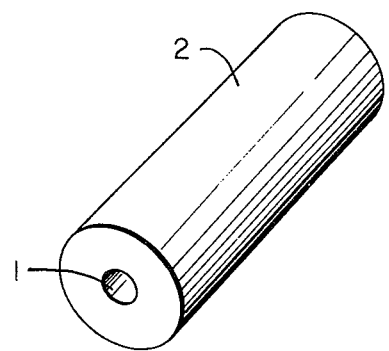
FIGS. 1–6 are perspective drawings of shapes of various embodiments of the catalyst of the invention.

In the cylindrical shape of FIG. 1 the reactive gases are passed through the hollow center of the catalyst, while its outside fits within the tube reactor, either loosely or tightly, as desired. In the star shapes of FIGS. 3–6 and the finned shape of FIG. 2 the reactor gases pass between the space defined by the plates, the interior wall of the tube and the central portion of the catalyst.

As shown in FIG. 5, the star shape may be provided with a hollow core through which a heat exchange fluid may be passed. The catalyst shape may be made in segments which are placed together end-to-end to fill the tube. Each segment is a relatively small fraction of the length of the tube, as for example six inches. Other lengths may be employed as convenient, so long as the massive character of the catalyst is retained. If necessary a metal tube such as stainless steel may be placed in the core to provide a leak-proof path for the heat-exchange fluid. Alternatively, the individual catalyst elements may be made so as to interlock and thus provide a continuous central channel, or a single catalyst structure may be provided of the same length as the tube wall reactor.

While the massive shapes have been disclosed as consisting essentially of Raney alloy and Raney nickel, other ingredients may be incorporated for specific purposes. For example, manganese, magnesium, and chromium are known to reduce the susceptibility of nickel to sulfur poisoning and may be incorporated in minor amounts. Calcium, which decreases the resistance of aluminum to corrosion may be added to increase the leachability of the aluminum in the Raney alloy. In addition to Raney nickel other Raney alloys such as Raney cobalt and Raney iron may be employed.

Although the invention has been illustrated showing Raney nickel and more broadly, Raney metals, other catalytic metals may be employed to produce catalysts of the general configuration shown herein, and even non-metallic catalysts may shaped as shown. If the catalyst metal is ductile, e.g. aluminum, the massive inserts could be formed by extrusion forging or similar means. While the channels shown in the Figures are longitudinal, they may also be angled, so as to provide a spiral gas flow, or transverse to provide a turbulent gas flow.

We claim:

1. A method of making a catalyst consisting essentially of forming a massive nickel-aluminum alloy and treating said alloy with an alkali solution to dissolve the aluminum from a surface layer of the alloy, whereby the surface of the alloy is catalytically activated.

2. The method of claim 1 in which the alloy consists of about 10 to 55 percent nickel and about 90 to 45 percent aluminum.

3. The method of claim 2 in which the alloy consists of about 42 to 50 percent nickel and about 58 to 50 percent aluminum.

4. The method of claim 1 in which the massive alloy is cylindrical and has a central bore.

5. The method of claim 1 in which the massive alloy has a plurality of planar elements radiating from a common central portion.

6. The method of claim 5 in which the common central portion has a longitudinal bore.

7. The method of claim 1 in which the treatment of the massive alloy consists of immersion in the alkali solution for a time sufficient to permit dissolution of the aluminum to a depth of about 0.25 to 1.25mm.

8. The method of claim 7 in which the alkali solution consists essentially of a solution of sodium hydroxide.

9. A catalyst consisting essentially of a massive nickel-aluminum alloy having a surface layer consisting essentially of high surface area nickel.

10. The catalyst of claim 9 in which the alloy consists of about 10 to 55 percent nickel and about 90 to 45 percent aluminum.

11. The catalyst of claim 10 in which the alloy consists of about 42 to 50 percent nickel and about 58 to 50 percent aluminum.

12. The catalyst of claim 9 in which the thickness of the surface layer of high surface area nickel is about 0.25 to 1.25mm.

13. The catalyst of claim 9 in which the massive alloy is cylindrical and has a central bore.

14. The catalyst of claim 9 in which the massive alloy has a plurality of planar elements radiating from a common central portion.

15. The catalyst of claim 14 in which the common central portion has a longitudinal bore.

* * * * *